United States Statutory Invention Registration [19]

[11] Reg. Number: H836

Suzuki et al. [43] Published: Nov. 6, 1990

[54] METHOD FOR ANALYSIS OF FINISHING AGENT APPLIED TO GLASS FIBER SUBSTRATE

[75] Inventors: Yoshiharu Suzuki; Hideharu Waketa, both of Fukushima, Japan

[73] Assignee: Nitto Boseki Co., Ltd., Fukushima, Japan

[21] Appl. No.: 210,664

[22] Filed: Jun. 20, 1988

[30] Foreign Application Priority Data

Jul. 24, 1987 [JP] Japan ..... 62-185159

[51] Int. Cl.[5] ..... G01J 1/00

[52] U.S. Cl. ..... 250/341; 250/340; 356/244

[58] Field of Search ..... 250/341, 340; 356/244

[56] References Cited

U.S. PATENT DOCUMENTS

| | | | |
|---|---|---|---|
| 3,510,194 | 5/1970 | Connelly | 356/244 |
| 4,541,717 | 9/1985 | Hamoto et al. | 356/244 |
| 4,564,503 | 1/1986 | Greisch | 356/244 |
| 4,661,706 | 4/1987 | Messerschmidt et al. | 250/341 |
| 4,695,727 | 9/1987 | Brierley et al. | 356/244 |

OTHER PUBLICATIONS

Willey, "FTIR Spectrophotometer for Transmittance and Diffuse Reflectance Measurements" *Applied Spectroscopy,* vol. 30 (No. 6), 1976, pp. 593–601.

Sen-i Gakkaishi, vol. 43, No. 6, pp. 313–319 (1987) Ikuta et al.

Applied Spectroscopy, vol. 38, No. 1, pp. 1–7 (1984) Culler et al.

News Paper (Nitsukei Sangyo Shinbun), issued Jun. 22, 1987.

News Paper (Nihon Kogyo Shinbun), issued Jun. 22, 1987.

News Paper (Nikkan Kogyo Shinbun), issued Jun. 22, 1987.

Abstract published in an annual meeting of Kobunski Gakkai, May 1988: 27-H-15.

*Primary Examiner*—Thomas H. Tarcza
*Assistant Examiner*—Linda J. Wallace

[57] ABSTRACT

Disclosed is a method for rapid and accurate qualitative and quantitative analysis of finishing agent applied onto the surface of a glass fiber substrate. This method comprises placing a glass fiber substrate to be tested in a Fourier transform infrared spectrophotometer equipped with a diffuse reflectance measuring device, irradiating said glass fiber substrate with infrared ray and carrying out qualitative analysis of finishing agent on the surface of the glass fiber substrate from wave number of infrared absorption peak produced at the irradiation and quantitative analysis of the finishing agent from intensity of the infrared absorption peak.

3 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR ANALYSIS OF FINISHING AGENT APPLIED TO GLASS FIBER SUBSTRATE

BACKGROUND OF THE INVENTION

The present invention relates to a method for rapid and accurate qualitative and quantitative analysis of a finishing agent applied to the surface of a glass fiber substrate.

Hitherto, as a method for qualitative and quantitative analysis of finishing agent on glass fiber substrate for printed wiring boards, there has been known "New Qualitative and Quantitative Analytical Method for Coupling Agent on Glass Cloth" Preprint Section 18-A (1961) of The Society of the Plastics Industry, Inc. This method utilizes color reaction of indicators (Methylene Blue method, Bromocresol Green method, etc.). In Japan, ignition of loss method according to JIS-R-3420 has been widely employed for quantitative analysis.

Printed wiring board are necessarily dipped in a molten solder bath during production of the printed wiring board and a significant problem is separation of glass cloth and epoxy resin at their interface due to thermal shock at the dipping.

This interfacial separation is greatly affected by properties of the finishing agent for glass fiber substrate. Therefore specifying the kind of the finishing agent and weighing thereof must be carried out accurately and rapidly.

Analysis of a the finishing agent applied to the surface of glass fiber substrate which greatly affects the performances of printed wiring board has been conducted by ignition of loss method which comprises heating a sample to 625° C. to burn the finishing agent which is an organic material.

However, this ignition of loss method has the following defects: (1) Qualitative analysis of finishing agent is impossible; (2) Measurement requires very long time; (3) Accuracy of quantitative analysis is not high.

Quality assurance of printed wiring board by the ignition of loss method cannot sufficiently express the state of finishing agent and besides rapid measure is impossible because of long time required for measurement.

Analysis of a finishing agent applied onto the surface of a glass fiber substrate by infrared absorption method is also attempted. (See, for example, "Sen-i Gakkaishi" vol. 43 (1987) page 313 and "Applied Spectroscopy", vol. 38 (1984), page 1). However, according to such a method, when the amount of finishing agent contained in the sample is small and especially when the deposition amount of finishing agent is small because the surface area is small as in industrial products which are relatively large in fiber diameter the, spectrum is indefinite and the analysis is difficult.

SUMMARY OF THE INVENTION

The present invention provides a method for accurate and rapid qualitative and quantitative analysis of finishing agents such as coupling agent, surface active agent and the like applied to the surface of a glass fiber substrate for printed wiring board.

DESCRIPTION OF THE INVENTION

Figure 1:
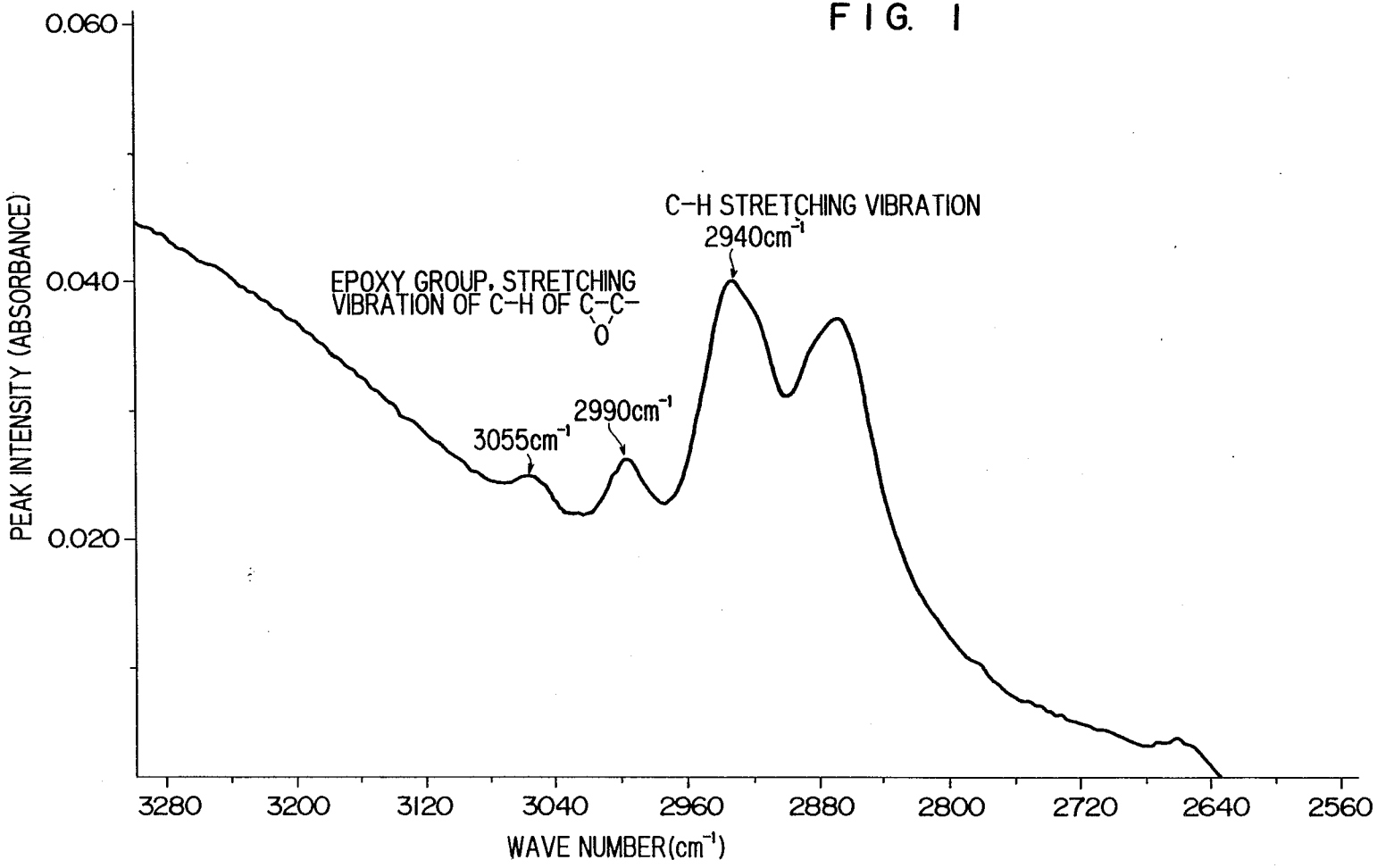
FIG. 1 shows an infrared absorption spectrum of a glass fiber woven fabric treated with epoxy silane of 0.6% by weight in concentration.

The present invention is a method for analysis of a finishing agent on glass fiber substrate, characterized in that the glass fiber substrate to be tested is placed in a Fourier transform infrared spectrophotometer equipped with a diffuse reflectance measuring device, said glass fiber substrate is irradiated with infrared rays and qualitative analysis of the finishing agent on the surface of the glass fiber substrate is carried out from wave number of infrared absorption peak produced at the time of the irradiation and quantitative analysis of the finishing agent is carried out from the intensity of the infrared absorption peak.

According to the present invention, a glass fiber substrate applied with a finishing agent used for cloth, woven fabric, non-woven fabric, mat, paper or chopped strand is irradiated with infrared rays from a Fourier transform infrared spectrophotometer and reflected infrared rays are collected by a diffuse reflectance measuring device. Taking the ratio of incident infrared rays and reflected infrared rays at this time, absorption of specific wavelength depending on the structure of the finishing agent can be observed and furthermore, the infrared absorption spectrum obtained at this time is subjected to automatical wave treatment by a computer to display it in a graph.

Since the glass fiber substrate shows very strong absorption and anomalous scattering by siloxane bond (Si-O-Si), absorption by the finishing agent cannot be detected in the region of wave number of 1600–1000 $cm^{-1}$. Therefore, in order to detect the absorption by organic functional group of finishing agent, it is necessary to measure absorption spectrum in the region of wave number of 3300–2500 $cm^{-1}$.

In order to perform accurate and rapid analysis, usually measurement is carried out by the combination of a Fourier transform infrared spectrophotometer and a diffuse reflectance measuring device with a trialycine sulfate TGS detector or mercury cadmium tellurium MCT detector and a computer with wave separating program. In this case, use of a high sensitivity MCT detector is preferred for improvement of accuracy. It is similarly preferred to use a sample holder. According to this sample holder, a sample is put on a sample carrier, a crystal plate of an infrared ray transmitting substance is put on the sample and these are fixed by a fastener from above.

As the crystal plates of infrared transmitting substance provided on sample carrier, there may be preferably used those of ZnSe, Si, KBr, Ge, KRS-5 and the like. When the sample holder is used, it is preferred to use the sample carrier and fastener made of metals which do not affect the wave number of 3300–2500 $cm^{-1}$ and stainless steel is especially preferred.

Any wave form separating programs may be conveniently used as far as they can separate overlapping two or more infrared absorption peaks.

Being different from the conventional ignition of loss method, the method of the present invention makes it possible to perform non-destructive analysis of a glass fiber substrate. Furthermore, according to the method of the present invention, qualitative and quantitative analysis becomes possible from the position, and height or area of the peak of the infrared absorption spectrum. With reference to the necessary amount of sample, several ten grams is required in the case of the conventional ignition of loss method while only several milligrams is sufficient for the analytical method of the present invention. Further, the conventional ignition loss method requires 3 hours for measurement while measurement can be completed in only in 10 minutes according to the method of the present invention. Thus the, necessary amount of material and time required for measurement can be greatly reduced.

The following nonlimiting examples illustrate preferred embodiments of the analytical method of the present invention. All % in the examples mean % by weight.

EXAMPLE 1

A heat treated and degreased glass fiber woven fabric (Tradename: WEA-18W manufactured by Nitto Boseki Co., Ltd.) of 212 $g/m^2$ in unit weight was used as a glass fiber substrate.

Aqueous solutions of silane coupling agent (Tradename: EPOXYSILANE A-187 for γ-glycidoxypropyltrimethoxysilane manufactured by Japan Uniker Co.) of 0.2%, 0.4%, 0.6%, 0.8%, 1.0%, 1.2% and 1.4% in concentration were adjusted to pH 4 with acetic acid. These were used as finishing agents.

The above woven fabric was dipped in each of these solutions, then squeezed to pick-up 25% by mangle and thereafter dried by heating at 110° C. for 30 minutes.

Figure 4:
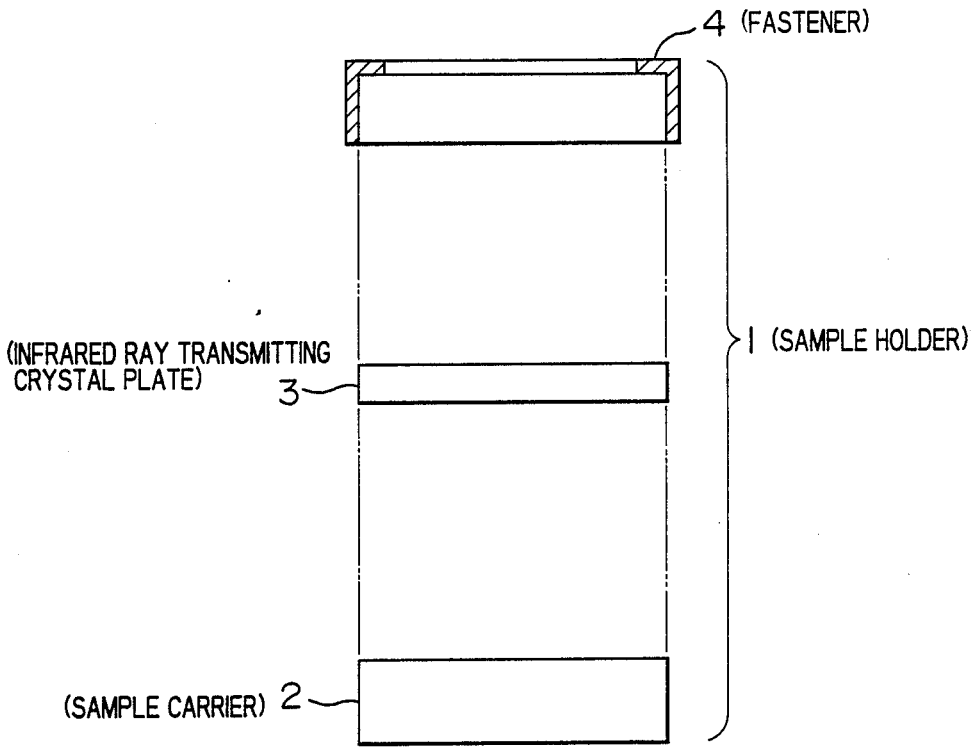
FIG. 4 is a disassembling side view of a partial cross section of a sample holder.

A circular sample of 10 mm in diameter was cut out from said glass fiber woven fabric applied with the finishing agent. This sample was fixed by sample holder 1 made of stainless steel as shown in FIG. 4 on a of diffuse reflectance measuring device of Fourier transform infrared spectrophotometer system [JIR-3510 manufactured by Nippon Denshi Co. including high sensitivity MCT detector IR-DET 101, diffuse reflectance measuring device IR-DRA 110 and wave form separating program (Lorentjian and Gaussian curve fitting)]. The sample holder 1 comprises a sample carrier 2 made of stainless steel, an infrared transmitting crystal plate 3 which is put on the sample carrier and a stainless steel fastener 4. The sample was put on the sample carrier 2 and covered with infrared transmitting crystal plate 3 (crystal plate of KBr in this example). These were further covered with stainless steel fastener 4, thereby to firmly fix the sample. This holder with the sample which was uniformly stretched to remove shrinkage of glass fiber woven fabric was inserted in the diffuse reflectance measuring device and was irradiated with infrared ray and the infrared absorption spectrum was measured.

FIG. 1 shows an infrared spectrum of the sample treated with 0.6% aqueous solution of epoxysilane. The peaks at 3055 $cm^{-1}$ and 2990 $cm^{-1}$ in FIG. 1 show stretching vibration of C-H of epoxy group

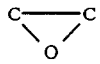

and clearly show presence of epoxysilane. That is, this means that qualitative analysis can be performed.

The absorption peak at 2940 $cm^{-1}$ shows stretching vibration of C—H of $CH_2$ and quantitative analysis can be performed from calibration curve prepared by measuring height or area of the peak.

Figure 2:
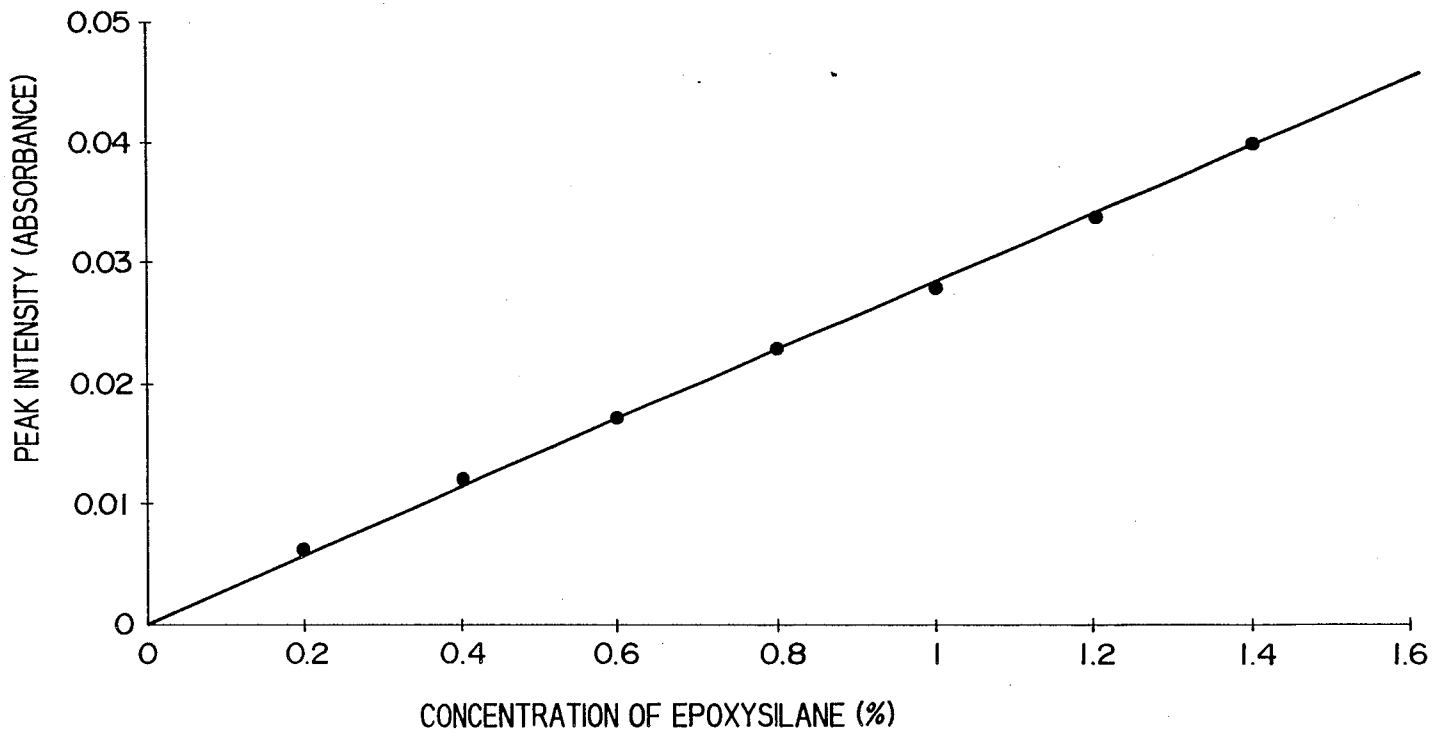
FIG. 2 is a calibration curve which shows the relation between concentration of epoxy silane and absorption peak intensity of 2940 $cm^{-1}$.

FIG. 2 is a graph which shows the relation between concentration of the epoxysilane and intensity of infrared absorption peak at 2940 $cm^{-1}$. When epoxysilane concentration is low, it may be considered that selective adsorption of epoxysilane does not occur and thus it can be considered that the epoxysilane concentration is in proportion to deposition amount onto glass fiber substrate. Therefore, FIG. 2 can be said to show relation between the deposition amount and peak intensity.

Figure 3:
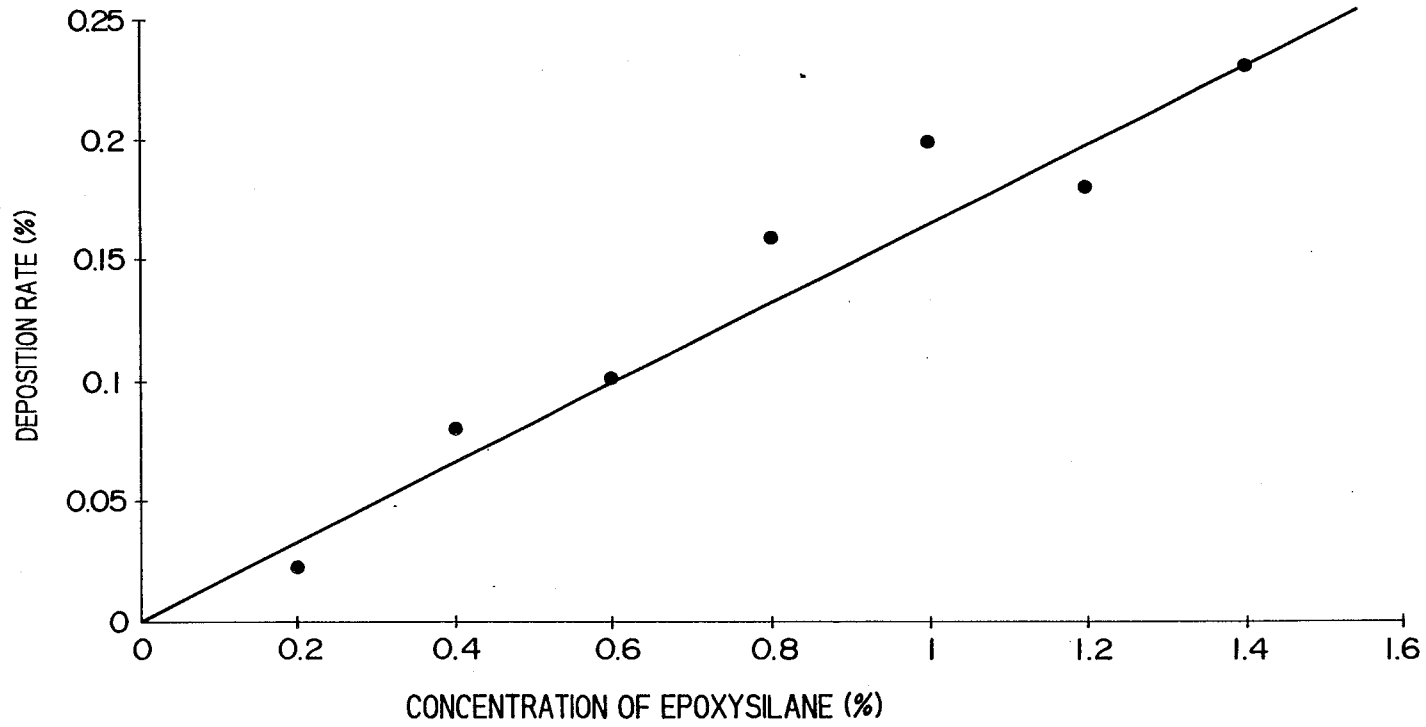
FIG. 3 is a calibration curve which shows the relation between concentration and deposition rate of epoxy silane according to the ignition of loss method.

FIG. 3 is a graph which shows the relation between epoxysilane concentration and deposition amount measured by the conventional ignition of loss method.

When comparing FIG. 2 and FIG. 3, it can be seen that FIG. 2 is far less in scattering than FIG. 3 and superior to FIG. 3 in linearity and thus the method of the present invention is high in reliability as a method of quantitative analysis.

EXAMPLE 2

The procedure of Example 1 was repeated except that a silane coupling agent (Tradename: KBM-573, N-phenyl-γ-aminopropyltrimethoxysilane manufactured by Shin-Etsu Chemical Co., Ltd.) was used in place of epoxysilane and infrared absorption spectrum was measured.

Figure 5:
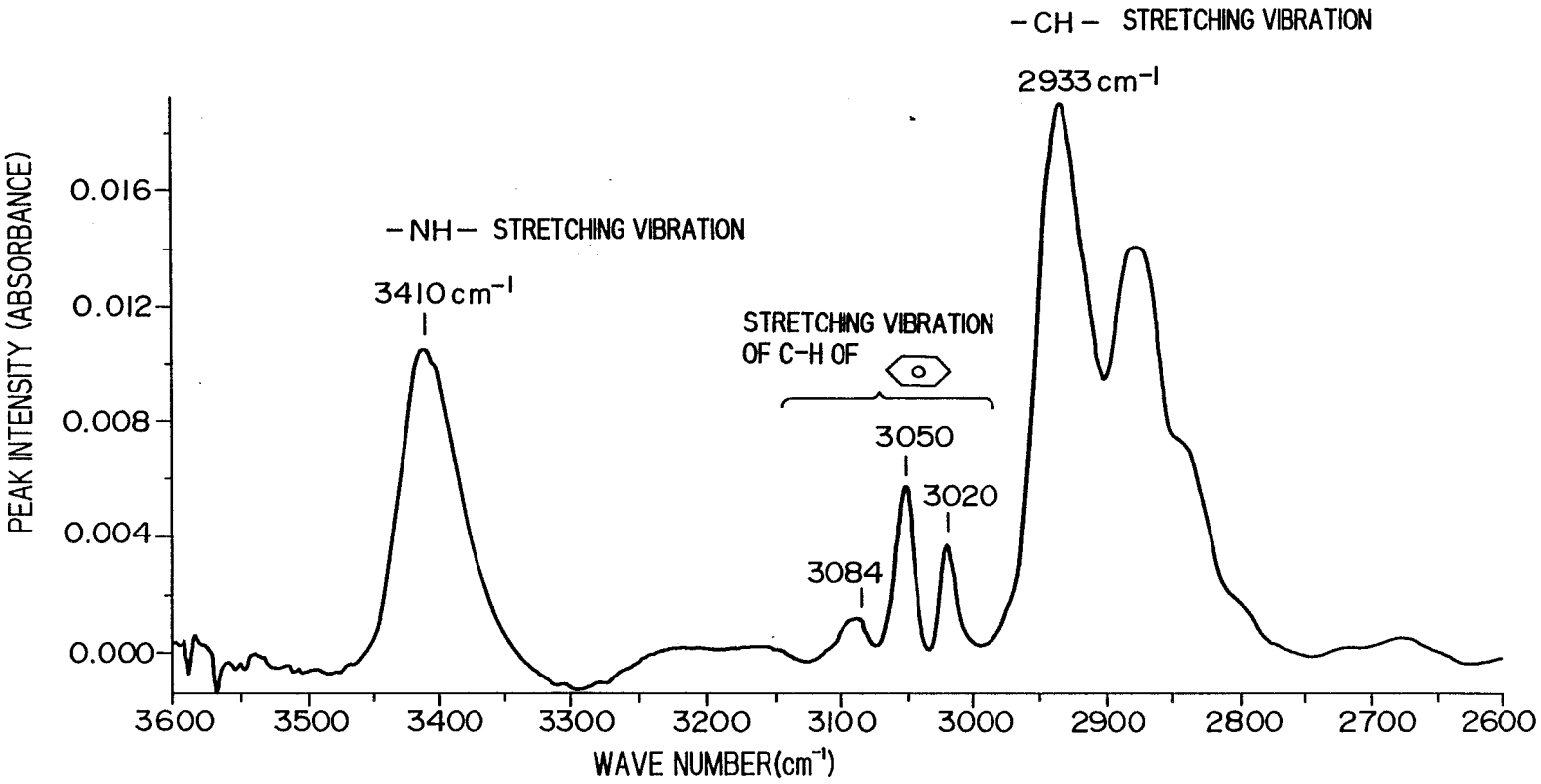
FIG. 5 is an infrared absorption spectrum of a glass fiber woven fabric treated with aminosilane of 0.6% by weight in concentration.

FIG. 5 shows an infrared absorption spectrum of the sample treated with a 0.6% aqueous solution of N-phenyl-γ-aminopropyltrimethoxysilane. The absorption peak at 3410 $cm^{-1}$ in FIG. 1 shows stretching vibration of amino group (NH) and absorption peaks at 3084, 3050 and 3020 $cm^{-1}$ indicate stretching vibrations of C—H of benzene ring. These results clearly show the presence of N-phenyl-Y-aminopropyltrimethoxysilane.

Further, the absorption peak at 2933 $cm^{-1}$ indicates stretching vibration of C—H of $CH_2$ and quantitative analysis can be performed from a calibration curve prepared by measuring the height or area of this peak.

Figure 6:
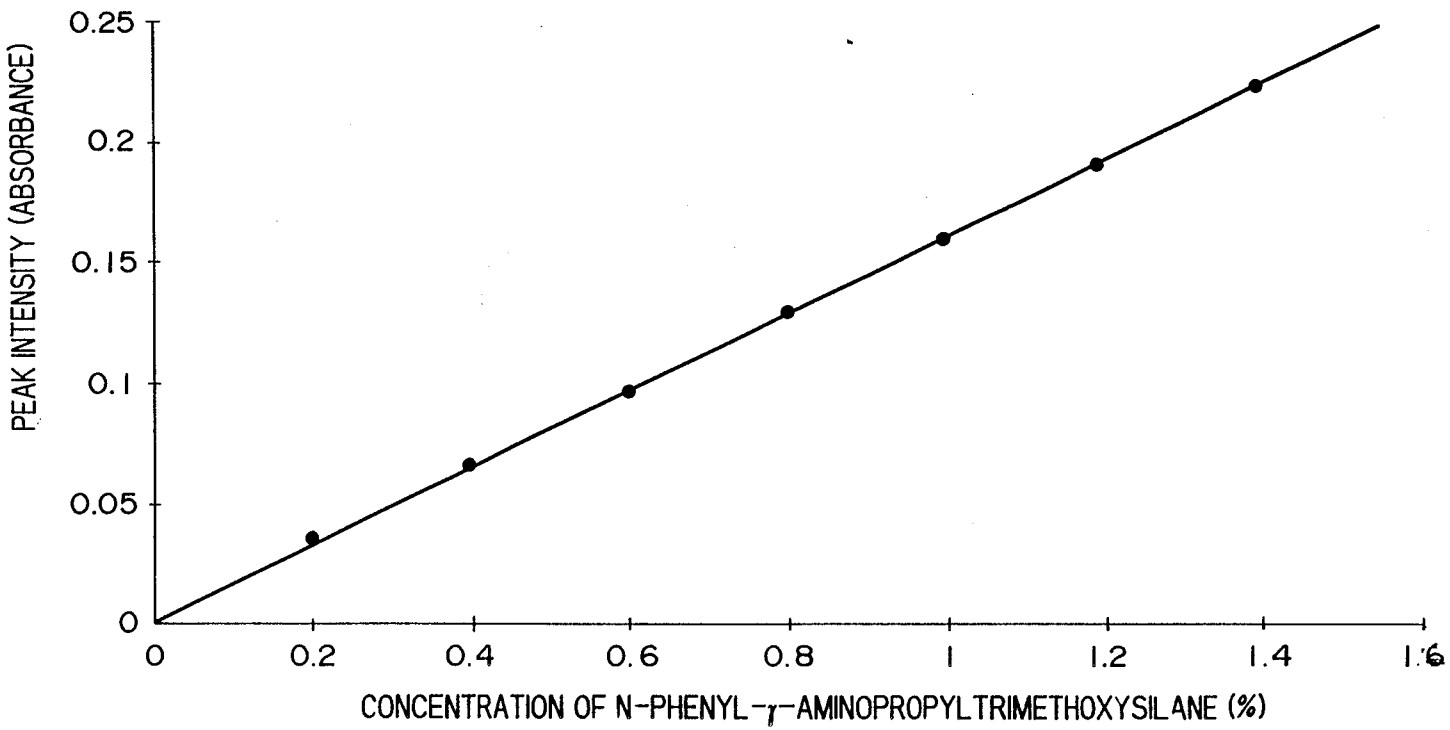
FIG. 6 is a calibration curve which shows the relation between concentration of aminosilane and absorption peak intensity of 2933 $cm^{-1}$.

FIG. 6 shows the relation between the aminosilane concentration and intensity of the infrared absorption peak at 2933 $cm^{-1}$. It can be seen therefrom that a superior linear relation can be obtained between the concentration and the peak intensity.

As explained above, qualitative analysis and quantitative analysis of a finishing agent applied to a glass fiber substrate for printed wiring board can be highly accurately and rapidly carried out by the analytical method of the present invention which utilizes a Fourier transform infrared spectrophotometer. Therefore, the method can be applied to quality assurance of printed wiring boards which depend on finishing agents and thus makes a great contribution to increase reliability of quality and dissolution of problems in interfaces of glass fiber reinforced composite materials.

What is claimed is:

1. A method for analysis of a finishing agent applied to a glass fiber substrate which comprises placing a glass fiber substrate to be tested in a Fourier transform infrared spectrophotometer equipped with a diffuse reflectance measuring device, irradiating said glass fiber substrate with an infrared ray and carrying out qualitative analysis of the finishing agent on the surface of the glass fiber substrate from the wave number of an infrared absorption peak produced at the irradiation and quantitative analysis of the finishing agent from the intensity of the infrared absorption peak.

2. A method according to claim 1 wherein the Fourier transform infrared spectrophotometer includes a triglycine sulfate detector or a mercury cadmium tellurium detector and a wave separating program.

3. A method according to claim 2 wherein the mercury cadmium tellurium detector is a high sensitivity mercury cadmium tellurium detector.

* * * * *